(No Model.)
C. C. SMALLEY.
MEANS FOR SECURING PULLEYS TO SHAFTS.
No. 357,238. Patented Feb. 8, 1887.
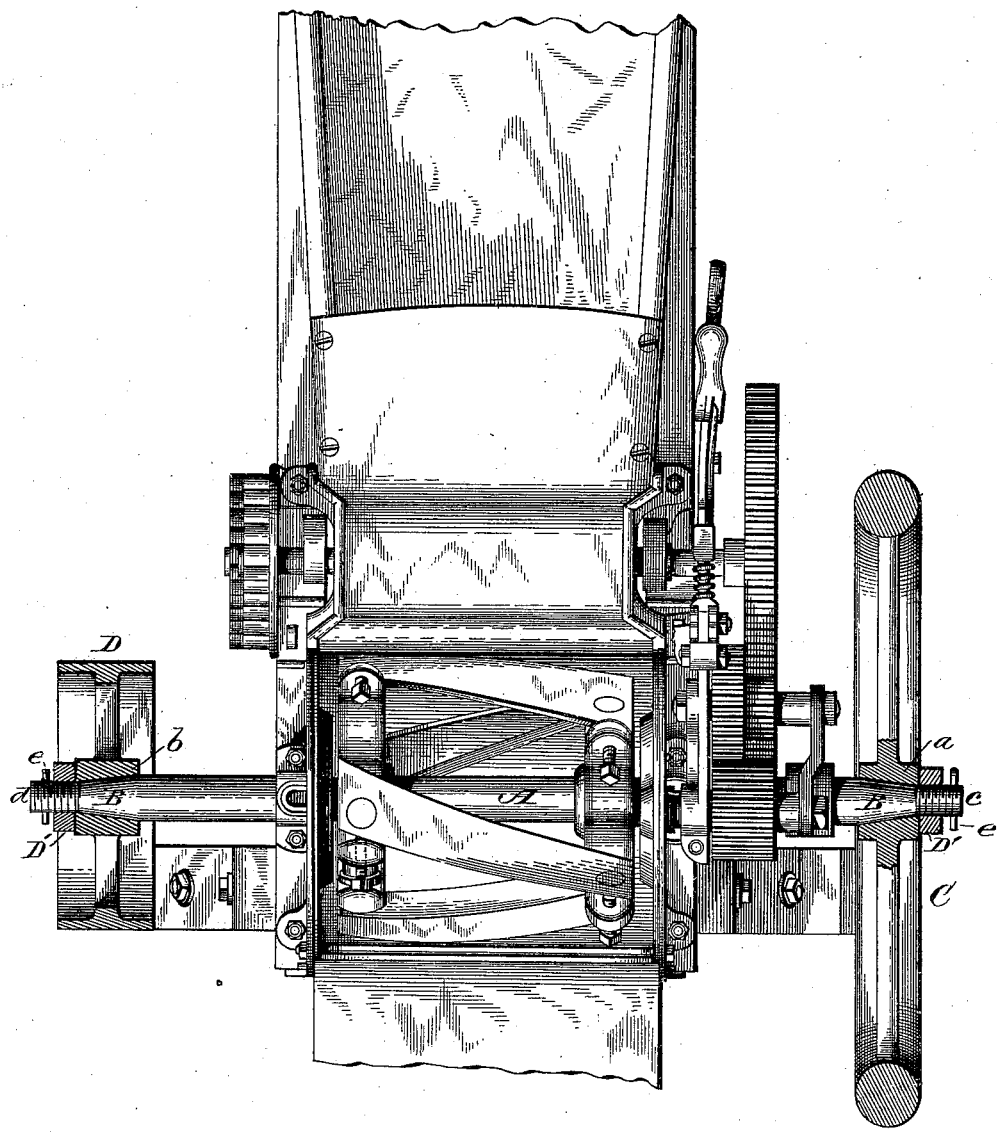
Witnesses
Inventor
Clarence C. Smalley,
By his Attorney Chas. H. Fowler

UNITED STATES PATENT OFFICE.

CLARENCE CHRISTIAN SMALLEY, OF MANITOWOC, WISCONSIN.

MEANS FOR SECURING PULLEYS TO SHAFTS.

SPECIFICATION forming part of Letters Patent No. 357,238, dated February 8, 1887.

Application filed May 6, 1886. Serial No. 201,330. (No model.)

*To all whom it may concern:*

Be it known that I, CLARENCE CHRISTIAN SMALLEY, a citizen of the United States, residing at Manitowoc, in the county of Manitowoc and State of Wisconsin, have invented certain new and useful Improvements in Means for Securing Fly-Wheels and Pulleys to Shafts; and I do hereby declare that the following is a full, clear, and exact description of the same, reference being had to the annexed drawing, making a part of this specification, and to the letters and figures of reference marked thereon.

The object of the present invention is to provide means for attaching the fly-wheels and belt-pulleys to the ends of rotary driving-shafts for all classes of machinery—such as feed-cutters and like machines where a rotary driving-shaft is employed; and it consists in providing each end of said shaft with tapering bearings and right and left screw-threaded extremities for the reception of screw-threaded nuts to hold in place on the bearings the tapering hubs of the fly-wheel and pulley, as will be hereinafter described and claimed.

In the accompanying drawing I have shown a top view of a feed-cutter to better illustrate the application of my invention, the fly-wheel, pulley, and nuts being in section.

The rotary driving-shaft A, in the present instance, I have shown as provided with the usual cutting-knives employed for cutting the feed. This shaft at its ends has tapering bearings B, to receive the correspondingly-tapering hubs *a b* of a fly-wheel, C, and belt-pulley D, respectively. The extremities of the tapering bearings B terminate in right and left hand screw-threads *c d* to receive screw-nuts D', which are screw-threaded to correspond with the screw-threaded extremities of the tapering bearings, the nuts being held thereon by split or other suitable keys, *e*. The nuts, when tightened, force the fly-wheel and pulley onto the tapering bearings and hold them firmly in position.

Now, in case any obstruction comes in contact with the knives, which will produce a sudden jar upon the rotary shaft and tends to stop its velocity, the fly-wheel will turn on the tapering bearing, thereby loosening the nut, which immediately frees the fly-wheel and prevents any possibility of accident to the machine. The same result is obtained from the belt running on the pulley. A sudden jar or unusual obstruction meeting the knives, the belt will loosen the pulley.

The essential feature of my invention is, providing both ends of the rotary driving-shaft with tapering bearings and right and left hand screw-threaded extremities, respectively, thereby providing means for releasing both the fly-wheel and belt-pulley, as hereinbefore described, and also enabling the driving-pulley to be changed from one end of the shaft to the other to make it more convenient in operating, or should it be desired to run the knives in opposite directions, in order to make an up cut instead of down, this being attained by changing the nuts to the opposite ends of the shaft.

It will be noticed that the hubs of both fly-wheel and pulley are of sufficient length that when on the shaft the outer ends thereof will extend slightly beyond the tapering bearings and over the thread on the extremities, so that when the nuts are tightened up they will have a bearing-surface on the hubs.

Having now fully described my invention, what I claim as new, and desire to secure by Letters Patent, is—

A driving-shaft having at each end a tapering bearing terminating in a screw-threaded extension, and keys attached to their extremities, in combination with the belt-pulley and fly-wheel having tapering hubs to fit over the bearings of the shaft, and of sufficient length to project a short distance over the screw-threads, and nuts engaging the screw-threaded extensions and bearing with frictional contact against the hubs, a space being left between the nuts and keys to admit of the former being loosened by any sudden jar upon the pulley or wheel, substantially as and for the purpose set forth.

In testimony that I claim the above I have hereunto subscribed my name in the presence of two witnesses.

CLARENCE CHRISTIAN SMALLEY.

Witnesses:
CHAS. F. SMALLEY,
A. J. ROEFFS.